US006222296B1

(12) United States Patent
Sakai et al.

(10) Patent No.: US 6,222,296 B1
(45) Date of Patent: *Apr. 24, 2001

(54) ELECTRIC MOTOR HAVING A STATOR WITH AN END CORE PART HAVING A DIFFERENT SHAPE THAN A CENTRAL CORE PART

(75) Inventors: Toshihiko Sakai; Yukinori Taneda; Hiromichi Hiramatsu; Noriaki Yamamoto; Yuji Enomoto, all of Yokohama; Takashi Ishigami, Fujisawa; Motoya Ito, Hitachinaka; Fumio Tajima, Ibaraki-ken; Masaharu Senoh, Narashino; Suetaro Shibukawa, Hitachinaka, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/060,912

(22) Filed: Apr. 15, 1998

(30) Foreign Application Priority Data

Apr. 21, 1997 (JP) .................................................. 9-102937

(51) Int. Cl.[7] .................................................... H02K 1/00
(52) U.S. Cl. ........................ 310/216; 310/216; 310/217; 310/218; 310/254; 310/258; 310/259
(58) Field of Search ........................................ 310/214, 215, 310/216, 217, 218, 259, 260, 270

(56) References Cited

U.S. PATENT DOCUMENTS

| 4,330,726 | * | 5/1982 | Albright et al. ............. 310/254 |
| 4,614,022 | * | 9/1986 | Bibby et al. ..................... 29/596 |
| 4,829,206 | * | 5/1989 | Honshima et al. ............ 310/214 |
| 4,940,913 | * | 7/1990 | Fritzsche ........................ 310/216 |
| 5,177,392 | * | 1/1993 | Scott ............................... 310/268 |
| 5,208,503 | * | 5/1993 | Hisey .............................. 310/259 |
| 5,539,974 | * | 7/1996 | Isayama ........................... 29/598 |
| 5,861,699 | * | 1/1999 | Kopac ............................. 310/254 |
| 5,877,574 | * | 3/1999 | Molnar ............................ 310/215 |
| 5,923,112 | * | 7/1999 | Bertocchi et al. ............. 310/217 |

FOREIGN PATENT DOCUMENTS 07-67272  8/1993 (JP) ..................................... 310/254

* cited by examiner

*Primary Examiner*—Elvin Enad
(74) *Attorney, Agent, or Firm*—Mattingly, Stanger & Malur

(57) ABSTRACT

An electric motor, wherein a space factor of a coil in a stator or a rotor is enhanced, and which has a central part core comprising a plurality of laminated electromagnetic steel plates stamped out into a predetermined slot sectional shape and an end part core which is disposed on at least one end part toward a laminating direction of the central part core and a core shape of the end part core is different from the core shape of the central part core.

7 Claims, 3 Drawing Sheets

ELECTRIC MOTOR HAVING A STATOR WITH AN END CORE PART HAVING A DIFFERENT SHAPE THAN A CENTRAL CORE PART

BACKGROUND OF THE INVENTION

1. Field of the Invention

The present invention relates to an electric motor, and more particularly, it relates to an electric motor which enhances a space factor of a coil in a stator or a rotor.

2. Description of the Related Art

In general, winding and insertion of the coil in a slot of a laminated core used in an electric motor juts out from the slot to a certain extent so that wire can be easily inserted into the slot by an insertor. Consequently, a size of a part of a coil end where the coil wire exceeds a loading thickness of the core is inevitably made large and this part of the coil end not only does not contribute to an output of the electric motor but also makes an occupied area of the electric motor large, thereby creating a primary factor for decreasing the efficiency of the electric motor.

Also in an electric motor, there is a stator used in a block construction such as described in Japanese Patent Application Laid-open No. 7-67272. This is a stator configuration of a synchronous machine for making it possible to use directional electromagnetic steel plates instead of non-directional electromagnetic steel plates as used in the past, wherein a yoke and teeth comprising the stator of the electric motor are separated and the core is formed by alternately combining and connecting a divided yoke piece and a divided teeth piece toward the laminating direction after a required number of coils formed in advance by winding are temporarily assembled to fit in each location in the space of the completed stator.

In this kind of electric motor, since the yoke and the teeth comprising an electric circuit are separated from each other, a magnetic body becomes discontinuous at a dividing part and a connecting part and a magnetic resistance thereof is increased. Hence, the problem of the electric motor efficiency decreasing results. Therefore, by using the directional electromagnetic steel plate for the magnetic body of the yoke and the teeth, an increase in magnetic resistance is suppressed, but a problem is the high cost of materials due to utilization of special steel plates.

SUMMARY OF THE INVENTION

It is the object of the present invention to provide a low-priced electric motor wherein a coil end part as described above is utilized effectively and the coil is easy to assemble due to the enhanced space factor.

The electric motor regarding the present invention is characterized in that a central part core comprising a plurality of laminated electromagnetic steel plates stamped out into a predetermined slot sectional shape and an end part core comprising a plurality of laminated electromagnetic steel plates on at least one end in the laminating direction of said central part core are different from each other in a core shape.

Consequently, the end part core of the present invention can be constituted from combination of a plurality of divided cores wherein the teeth and the yoke can be divided or a clearance shape size of the coil formed outside larger than the central part core side is disposed.

PREFERRED EMBODIMENT OF THE INVENTION

The embodiment of the present invention will be described in detail as follows with reference to the drawings attached thereto.

Figure 1:
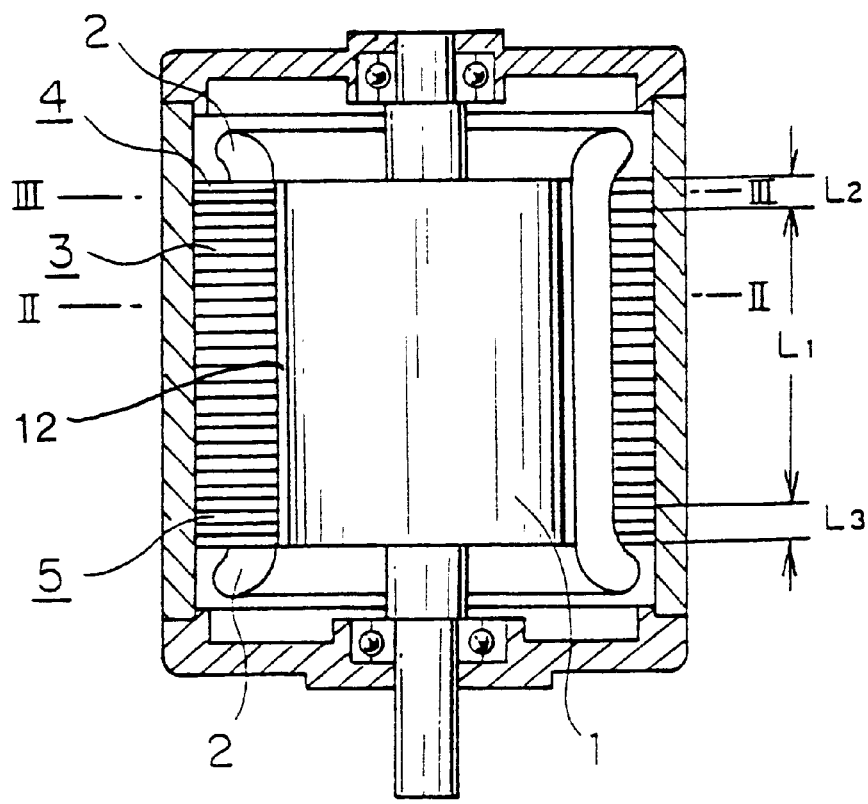
FIG. 1 is a longitudinal sectional view to show the principal parts of an electric motor according to the present invention.
Figure 2:
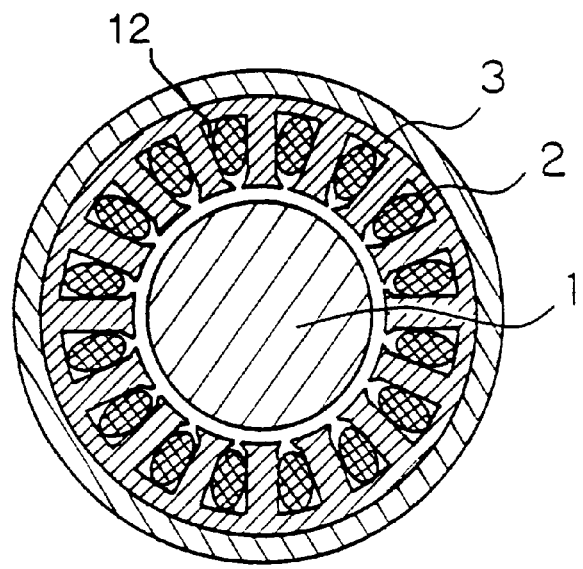
FIG. 2 is a sectional view cut along the line II—II of the stator part of FIG. 1.
Figure 3:
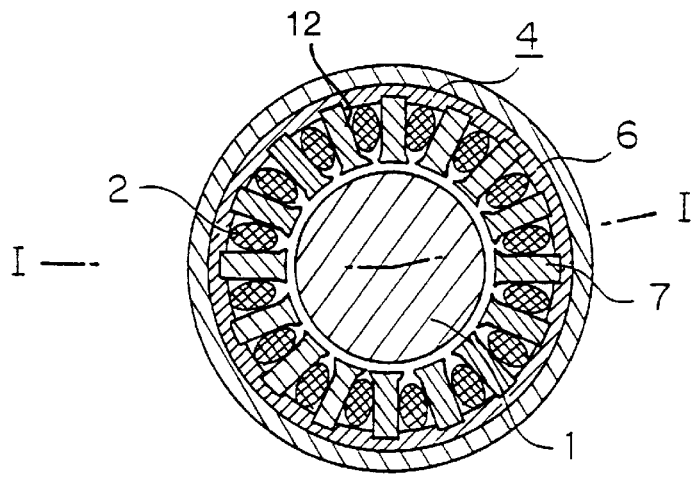
FIG. 3 is a sectional view cut along the line III—III of the stator part of FIG. 1.

FIG. 1 is a principal longitudinal sectional view of an electric motor according to the present invention. A stator part is disposed encircling a rotor 1 of a central part. The stator part has a stator core stamped out from electromagnetic steel plates and coils 2 wound up into slots 12 of the stator. The stator core is constituted from a central part core 3 having an axial length $L_1$ and upper and lower end part cores 4, 5 having axial lengths $L_2$ and $L_3$, respectively, laminated and disposed on both end parts of the laminating or axial direction of the central part core. The central part core 3 is identical to a conventional stator core as shown in FIG. 2 which is a sectional view cut along the line II—II of FIG. 1. The upper and lower end part cores 4, 5 are different from a conventional stator core and are shown in FIG. 3 which is a sectional view cut along the line III—III of FIG. 1 in the present embodiment. With regard to the end part core, there are the dividing end part cores forming in a separate body the core back part 6 in a ring shape as shown in FIG. 3 and the teeth part 7 and the integrated end part core integrating the core back part according to another embodiment as shown in FIG. 5 to FIG. 8 and the teeth part.

Figure 4:
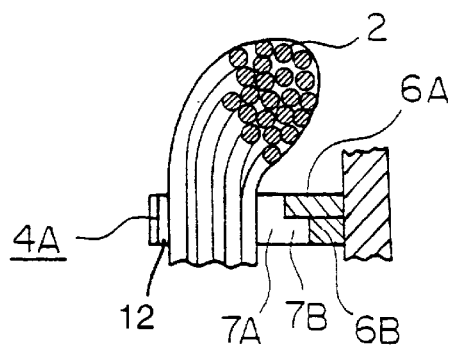
FIG. 4 is an enlarged view of a dividing end part core in a coil end.

The end part core 4A as shown in FIG. 4 is another embodiment wherein, in order to make assembly of the core back part and the teeth part easy, a plate thickness of the teeth part 7 is made twice the plate thickness of the core part 6 by changing the shape of the upper and lower core back parts 6A, 6B, while the thickness of the teeth end part 7 of the core back side is made equal to the plate thickness of the core back part 6 and, by the difference in level thereof, the assembly of the core back part and the teeth part is made much secure and then a thinned end part 7B of the teeth part 7A is inserted into the inside notch formed by the lower core back part 6B and the upper core back part 6A and fixed.

Figure 5:
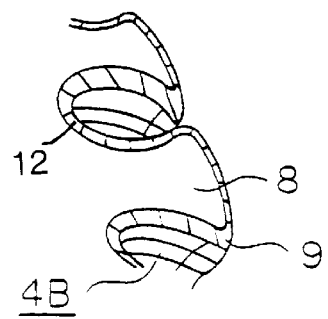
FIG. 5 is a principal sectional view of the integrated end part core to show another embodiment of the integrated end part core.
Figure 6:
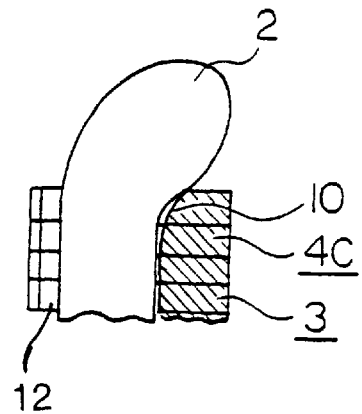
FIG. 6 is a principal sectional view to show still another embodiment of the integrated end part core of FIG. 5.
Figure 7:
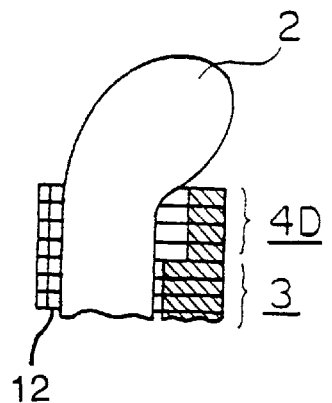
FIG. 7 is a principal sectional view to show still another embodiment of the integrated end part core.
Figure 8:
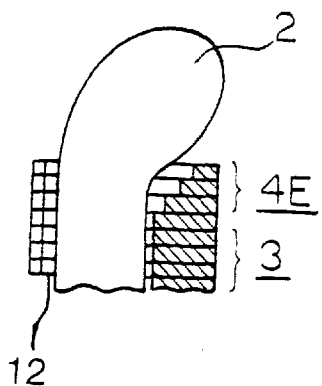
FIG. 8 is a principal sectional view to show still another embodiment corresponding to the integrated end part core of FIG. 7.

The integrated end part cores 4B, 4C, 4D and 4E as shown in FIG. 5 to FIG. 8 are also another embodiment, respectively, and fit for effectively utilizing the coil end where a coil winding is not housed within a loading thickness of the core. The integrated end part 4B of FIG. 5 is so constituted that a circular part 9 is formed on one piece only of a core 8 of the tip or upper most end part and a local force is not imposed to a coat of the wire by making a slot area large in the core end part which is susceptible to injury when the coil is inserted or when a shape is formed and thus production of a coil with a high space efficiency is made possible by increasing a wire concentration by keeping the wire from injury. When the circular part 9 is formed on one upper piece only of the core 8, a ridge-line part is formed by forging after the teeth part is stamped out by a press. The integrated end part core 4C of FIG. 6 forms a circular or curved shape 10 across several pieces of electromagnetic steel plates as a whole and makes the slot area susceptible to injury, large and is formed by cutting and grinding after the teeth part shape is stamped out by the press and a necessary number of pieces are laminated and fixed. The integrated end part core 4D of FIG. 7 is constituted by laminating a necessary number of electromagnetic steel plates of the same size only stamped out in a magnified or enlarged size from a stamping part as compared with the stamping size of the central part core 3 instead of by forming a circular shape. The integrated end part core 4E of FIG. 8 is constituted by laminating a necessary number of pieces of a different size, which becomes larger as it goes toward the tip most end part.

As described above, the method of using the dividing end part core and the method of using the integrated end part core are a little bit different with each other, but a fixing method thereof can utilize the conventional method of welding or caulking, etc.

That is to say, when the dividing end part core is used, in the first place, the core back part 6 of the end part cores 4, 5 is laminated and disposed on a fixed jig (not shown in the drawing) by holding the central part core at both sides thereof and the central part core 3 and the core back part 6 are fixed by welding a laminating contact surface toward a laminating direction. Next, the coil 2 wounded and formed in advance is inserted and the teeth part 7 is glued to the core back from inside of the coil or the teeth part 7, the core back part 6 and the coil 2 are integrated and fixed by a mold, etc.

Further, when the integrated end part core is used, the end part core is laminated by holding the central part core 3 at both sides and the laminating contact surface is fixed by the conventional method of welding, caulking, etc. and the coil winding is made by the insertor.

Note that, in the embodiment of FIG. 1, by comparing a torque T of a conventional electric motor with a torque T' of an electric motor according to the present invention, an equation to calculate how much the torque T' of the electric motor of the present invention is increased can be given as follows:

$$\frac{T'}{T} = \frac{L_1 + a(L_2 + L_3)}{L_1}$$

wherein factor a is 0<a<1. Here, if the core sizes are L1=85, L2=L3=3 and a=0.8, the following equation is given:

$$\frac{T'}{T} = \frac{85 + 0.8 \times (3 + 3)}{85} = 1.06$$

Thus, the torque increases as much as 6%.

What is claimed is:

1. An electric motor having a rotor and a stator, said stator having a core comprised of a plurality of laminated electromagnetic steel plates stamped out into predetermined sectional shapes and forming axially extending slots, said core consisting of an upper end part, a central part and a lower end part, all extending in an axial direction, and wherein the laminated electromagnetic steel plates of at least one of said upper end part and said lower end part are different in shape from the laminated electromagnetic steel plates of said central part.

2. The electric motor as described in claim 1, wherein said at least one of an upper end part and a lower end part is divided into a plurality of pieces.

3. The electric motor as described in claim 1, wherein said at least one of an upper end part and a lower end part is divided into teeth parts and yoke parts.

4. The electric motor as described in claim 1, wherein a shape of said slots of said at least one of said upper end part and said lower end part is different from a shape of said slots of said central part core.

5. The electric motor as described in claim 1, wherein the portions of said slots located in said at least one of an upper end part and a lower end part are larger than the portions of said slots located in said central part.

6. The electric motor as described in claim 1, wherein the laminated electromagnetic steel plates of both of said upper end part and said lower end part are different in shape from the laminated electromagnetic steel plates of said central part.

7. The electric motor as described in claim 6, wherein the portions of said slots located in said at least one of an upper end part and a lower end part are larger than the portions of said slots located in said central part.

* * * * *